US007616967B2

(12) United States Patent
Coulas (10) Patent No.: US 7,616,967 B2
(45) Date of Patent: Nov. 10, 2009

(54) MEDIA-SPECIFIC FLOOR CONTROL FOR PUSH-TO-X COMMUNICATION

(75) Inventor: Michael F. Coulas, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 703 days.

(21) Appl. No.: 11/189,077

(22) Filed: Jul. 25, 2005

(65) Prior Publication Data
US 2007/0021133 A1    Jan. 25, 2007

(51) Int. Cl.
*H04B 7/00*    (2006.01)
*H04Q 7/20*    (2006.01)

(52) U.S. Cl. .................. 455/518; 455/519; 455/416; 370/312; 370/260

(58) Field of Classification Search ......... 455/507–521, 455/416, 414.1; 370/328, 351, 352, 312, 370/260
See application file for complete search history.

(56) References Cited

U.S. PATENT DOCUMENTS

| | | | |
|---|---|---|---|
| 6,366,771 B1 * | 4/2002 | Angle et al. | 455/414.1 |
| 6,477,150 B1 * | 11/2002 | Maggenti et al. | 370/312 |
| 7,213,050 B1 | 5/2007 | Shaffer et | |
| 7,366,285 B2 * | 4/2008 | Parolkar et al. | 379/88.17 |
| 7,366,780 B2 * | 4/2008 | Keller et al. | 709/227 |
| 7,369,567 B2 * | 5/2008 | Newberg et al. | 370/432 |
| 2004/0037407 A1 | 2/2004 | Gourraud et al. | |
| 2004/0071099 A1 | 4/2004 | Costa-Requena et al. | |
| 2004/0128354 A1 | 7/2004 | Horikiri et al. | |
| 2004/0137887 A1 | 7/2004 | Niemi | |
| 2004/0174830 A1 * | 9/2004 | Koskelainen et al. | 370/260 |
| 2004/0190489 A1 * | 9/2004 | Palaez et al. | 370/351 |
| 2004/0196867 A1 | 10/2004 | Ejzak et al. | |
| 2005/0041578 A1 * | 2/2005 | Huotari et al. | 370/229 |
| 2005/0124365 A1 | 6/2005 | Balasuriya et al. | |
| 2005/0232241 A1 * | 10/2005 | Wu et al. | 370/352 |
| 2006/0083244 A1 | 4/2006 | Jagadesan et al. | |

OTHER PUBLICATIONS

Stephen M. Mueller, "APIs and Protocols for Convergent Network Services", McGraw-Hill Telecom Developer, 5 pages.
"Push-to-Talk over Cellular (PoC) User Plane; Transport Protocols; PoC Release 1.0", Transport Protocols V1.1.0 (Aug. 2003) Technical Specification, Ericsson, Motorola, Nokia, Siemens, 37 pages.

* cited by examiner

*Primary Examiner*—Sujatha Sharma
(74) *Attorney, Agent, or Firm*—Hisashi D. Watanabe (57) ABSTRACT

In the various embodiments of the present invention, a method of floor control in a PTX communications system comprises transmitting a floor control message via a floor control channel (905) wherein the floor control message consists of media designation fields (1003) for any possible requested media type. The media types preferred for the given requested PTX session are designated by populating the corresponding media type designators (1003) within the floor control message.

The Real Time Control Protocol (RTCP) may be used for the floor control messaging channel and is independent from the requested media streams (217) which are typically Real-time Transport Protocol (RTP) media streams. Support may be provided for older mobiles that do not support each type of RTP media stream, but will still receive and interpret the RTCP floor control messaging, which in the embodiments of the present invention, is common for all media types.

17 Claims, 11 Drawing Sheets

FIG. 10
BIT MAP FORMAT OF MEDIA SPECIFIC FLOOR CONTROL MESSAGES

FIG. 11
BIT MAP FORMAT OF MEDIA BIT MAP FIELD

*FIG. 12*

MEDIA-SPECIFIC FLOOR CONTROL FOR PUSH-TO-X COMMUNICATION

FIELD OF THE INVENTION

The present invention relates generally to wireless communications systems, and more particularly to multimedia Push-to-X (PTX) communications systems.

BACKGROUND OF THE INVENTION

Wireless Push-To-Talk (PTT) networks, are designed to facilitate communication among two or more users, and employ half-duplex communication. In such systems, a server is typically a centralized control point that grants a "floor" to a user who desires to speak to a respective talk group. Only one user may speak at one time. The user wishing to speak, pushes the talk button on a handset, gains the floor and speaks, while the other users may only listen during the interval.

There are possible use cases where a user may wish to transmit information, other than speech, for example a video file, live audio, streaming audio, still video, live video, streaming video, etc., or otherwise transmit a combination of media types to the talk group or to another user. Further, various applications, other than simply audio and video, that transmit data may make use of PTT functionality. Such systems may be referred to as "Push-to-X" (PTX) or "Push-to-multimedia" (PTM) systems.

Networks employing PTX capability may support a variety of mobile devices with various capabilities including older generation mobile devices that support some, but not all, of the various media types that could be utilized with PTX capabilities. The current systems and methods of floor control messaging do not enable participants in a PTX session to request and be granted the floor for combinations of media types, and do not provide notification of floor grants and availability to older generation mobiles that do not have all PTX capabilities. Therefore, compatibility difficulties arise for older mobile devices, which may be bandwidth limited, operating on networks with expanded PTX capability.

One possible solution is to establish multiple PTX sessions for a single user, in which each session, or each media stream, has an associated floor control messaging channel. This approach however, would be wasteful of resources and would neglect the problem of participating older generation mobiles that do not support all, or perhaps any, of the requested media streams requested by a newer model mobile station.

Therefore, a need exists for an improved floor control mechanism for PTX systems such that multimedia use cases may be better facilitated and older generation mobile stations may be supported.

DETAILED DESCRIPTION OF THE PREFERRED EMBODIMENTS

To address the above-mentioned need, a system and method for multimedia PTX, or more particularly PTX, floor control is provided herein.

In the various embodiments of the present invention, a method of floor control in a PTX communications system comprises transmitting a floor control message via a floor control channel wherein the floor control message consists of media designation fields for any possible requested media type. The media types preferred for the given requested PTX session are designated by populating the corresponding media type designators within the floor control message.

The Real Time Control Protocol (RTCP) may be used for the floor control messaging channel and is independent from the requested media streams which are typically Real-time Transport Protocol (RTP) media streams. Support may be provided for older mobiles that do not support each type of RTP media stream, but will still receive and interpret the RTCP floor control messaging, which in the embodiments of the present invention, is common for all media types.

Further, multiple RTCP channels may be used with distributed media type designations in order to provide flexibility. Other non-RTP media types could also be controlled by the RTCP floor control of the present invention, for example file sharing applications.

The term floor control as used herein references the processes by which a PTX server controls access to a mobile station (MS) by granting, denying, revoking, and releasing access to communication resources of the server, and controlling the communications and flow of data between various mobile stations during communications sessions. The embodiments of the present invention provide an improved floor control mechanism between a PTX server and an MS group.

The term floor request message, in accordance with embodiments of the present invention may comprise transmission of a particular protocol message, for example a Session Initiation Protocol (SIP) message, between a mobile station and a server. The process by which the server determines resource availability for communication with other mobile stations is the process by which the mobile station floor request is granted or denied.

Figure 1:
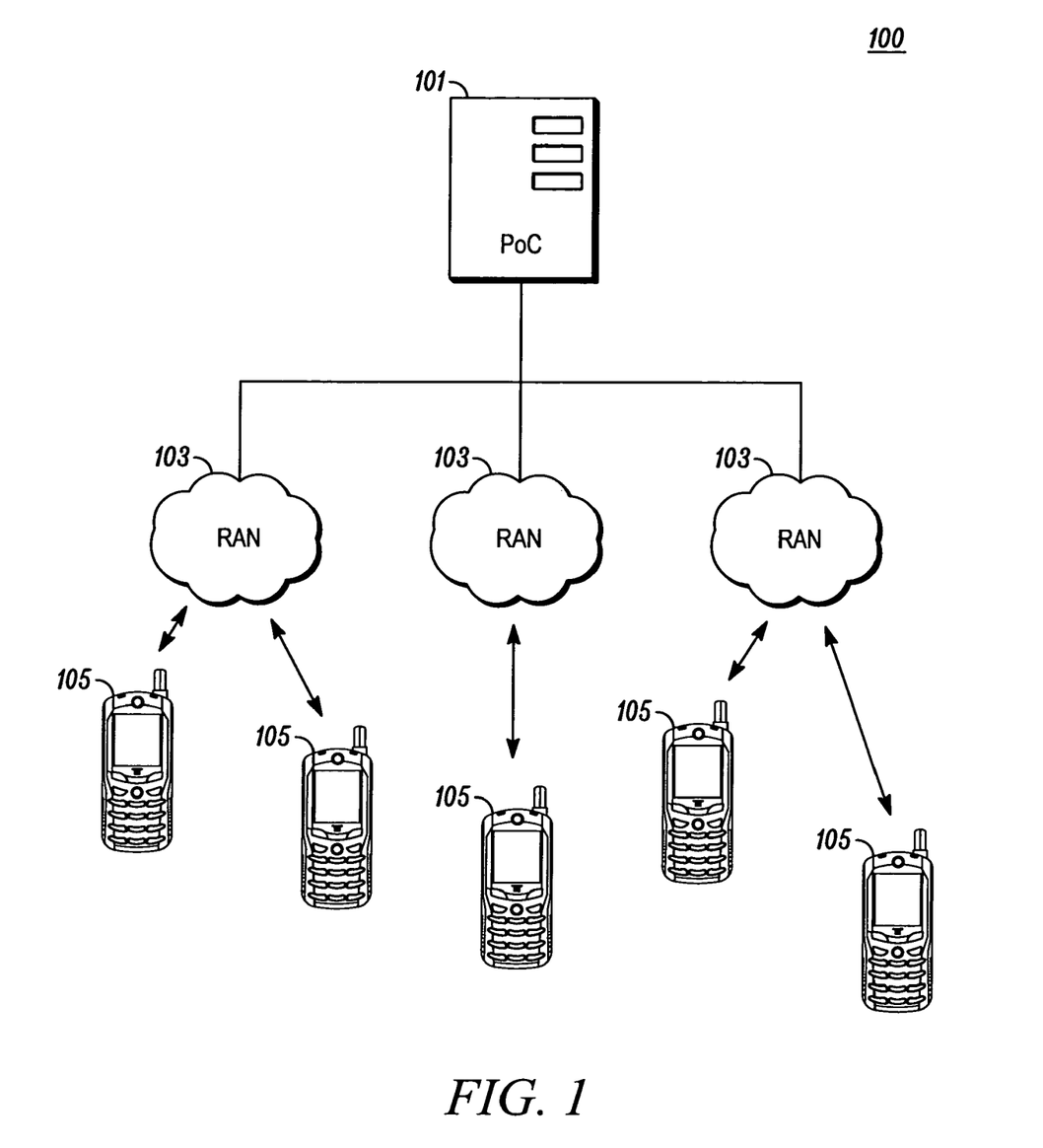
FIG. 1 is a block diagram of a wireless network employing Push-To-Talk (PTX) handsets and a Push-To-Talk over Cellular (PoC) server.

Turning now to the drawings, FIG. 1 illustrates a PTX network 100 having a plurality of Radio Access Networks (RANs) 103. Each RAN 103 may further comprise a plurality of base station transceivers (BTS) and base station controllers (BSC) providing radio communications resources for establishing communications with a plurality of mobile stations 105. The plurality of RANs 103 are connected to, and able to communicate with, a Push-to-talk over cellular (PoC) server 101. The PoC server 101 is a logical network element and may be integrated into other physical network elements of a RAN and still remain in accordance with the present invention.

Further, the RAN and PoC server may represent a wireless local area network (WLAN) or wireless broadband network, employing various air interfaces such as but not limited to 802.11, 802.16, Bluetooth™, etc., wherein the plurality of mobile stations 105 may also have the capability of communicating over one or more wireless air interfaces including but not limited to GSM, GSM/EDGE, UMTS, CDMA2000, etc., such that a PTX session may be conducted using any of the air interfaces.

Figure 2:
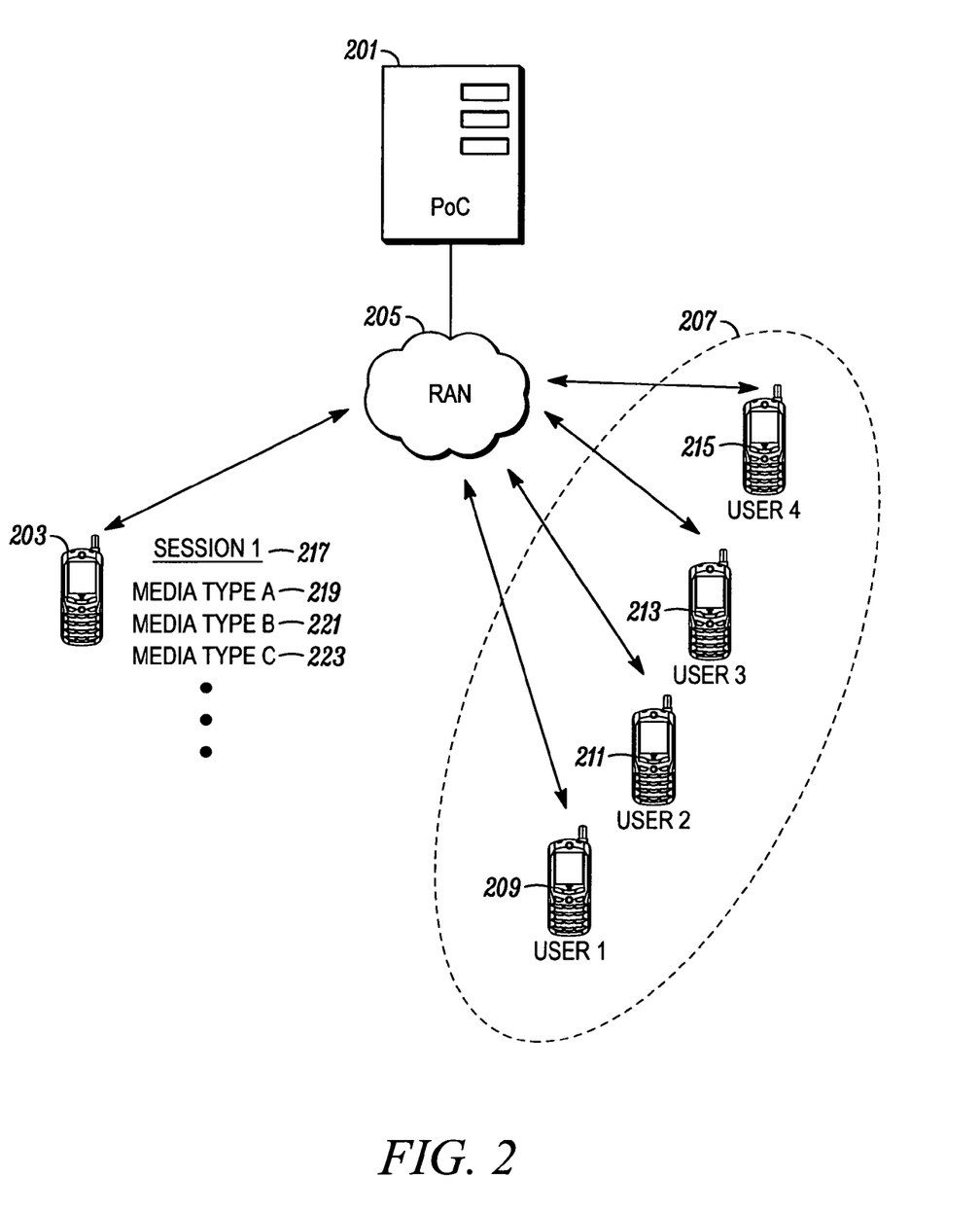
FIG. 2 is a block diagram of a mobile station and PoC server in accordance with an embodiment of the present invention.

FIG. 2 illustrates an operation of a mobile station 203 in accordance with an embodiment of the present invention. In FIG. 2, mobile station 203 communicates with at least one member of a talk group 207, over a RAN 205 and using the PoC server 201 for PTX capability. For example, as shown in FIG. 2, the talk group 207 may include mobile stations 209, 211, 213 and 215 which are operated by users 1, 2, 3 and 4, respectively. Mobile station 203 may establish a PTX communication session 217 in which multiple media types 219, 221, 223, etc., are employed. The PTX session 217 may be accomplished by, but is not limited to, a Packet Data Protocol (PDP) context on a GSM/GPRS, EGPRS, GSM/EDGE or UMTS network.

In an alternative embodiment, mobile station 203 may communicate with one or more of the talk group 207 mobile stations by establishing a connection directly via RAN 205 and without server 201. For example, mobiles station 203 may transmit a SIP INVITE message to one or more of the talk group 207 mobile stations to establish a connection.

Figure 3:
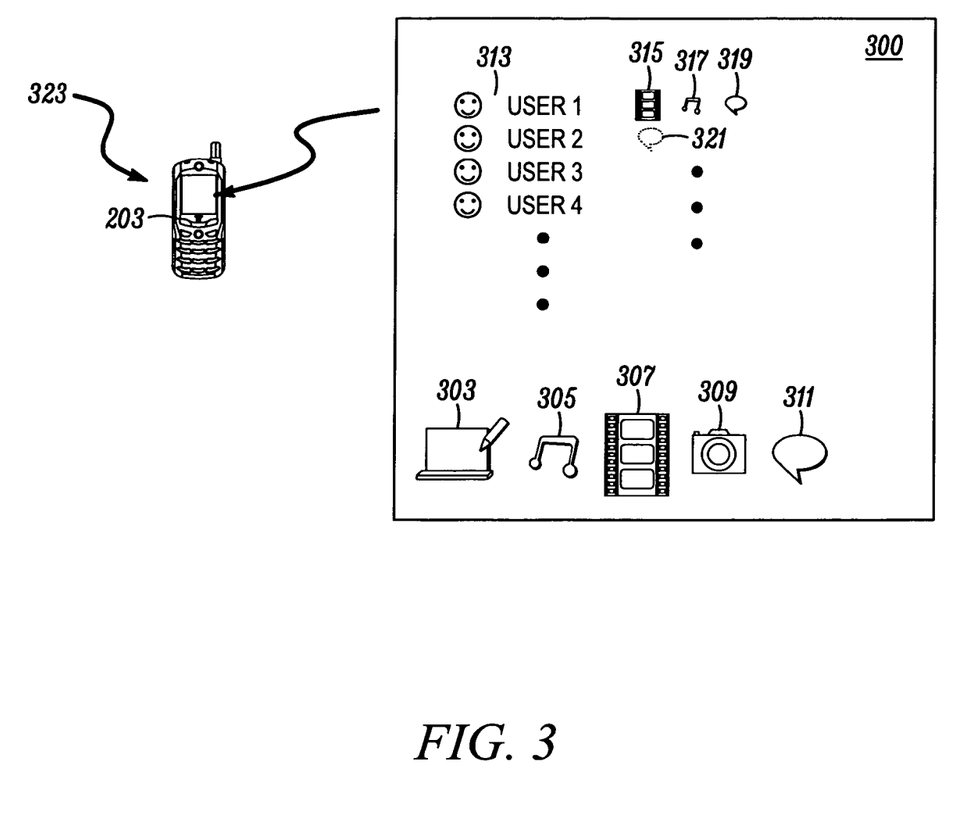
FIG. 3 is a block diagram of a mobile station graphic display in accordance with an embodiment of the present invention.

FIG. 3 provides further details of a graphic display 300, of mobile station 203, in accordance with an embodiment of the present invention. While FIG. 3 is exemplary only, and it is to be understood that there are other suitable ways to visually convey the information illustrated by FIG. 3 using a graphic display, the basic representations illustrated by FIG. 3 are helpful to understanding the operation of some embodiments of the present invention.

The mobile station graphic display 300 comprises representations, which may be icons as illustrated, for requesting a floor for a given media type and corresponding to a media resource. Each icon may also correspond to an application that includes one or more media types. For example, whiteboard icon 303 would be selectable by the user to request the floor for a whiteboard application. Similarly, audio icon 305 enables the user to request the floor to transmit an audio stream or file, while video icon 307 enables the user to request the floor to transmit a video stream or file which may consist of both a video and audio data. Likewise, image icon 309 enables the user to request the floor to transmit an image file or stream of images, while commentary icon 311 enables the user to request the floor to transmit voice data.

Further, an icon may be used to represent a member of a given talk group. For example, user icon 313 indicates that User 1 is a member of the talk group in which the mobile station 201 user is a participant. Additionally, other icons may be used to indicate which floors, and also the corresponding media resources and media streams, that are currently held by the talk group participants. For example, video icon 315 and audio icon 317 may indicate that User 1 currently has the floor to transmit a video file with audio. Commentary icon 319 may indicate that User 1 also has the floor for voice transmission. If User 2 obtains the floor, for example to comment on User 1's video clip, the commentary icon 321 which is shown by dotted lines, may appear to indicate that User 2 has taken the floor for speech while commentary icon 319 would disappear to represent the floor being revoked from User 1.

Each user of the talk group similarly has icons for indication of which user has the floor and for what media types. The activation of PTX button 323 of the mobile station 203 however, is still used to request the floor for speech, although an icon such as commentary icon 311 may be used additionally or as an alternative for initiating a floor request. Further, older generation mobiles may use other means than shown in FIG. 3, for making floor requests and for receiving notification messages. For example, a special media specific tone may sound to alert the mobile station user that the floor has been taken for a particular media type such as a video stream.

Figure 4:
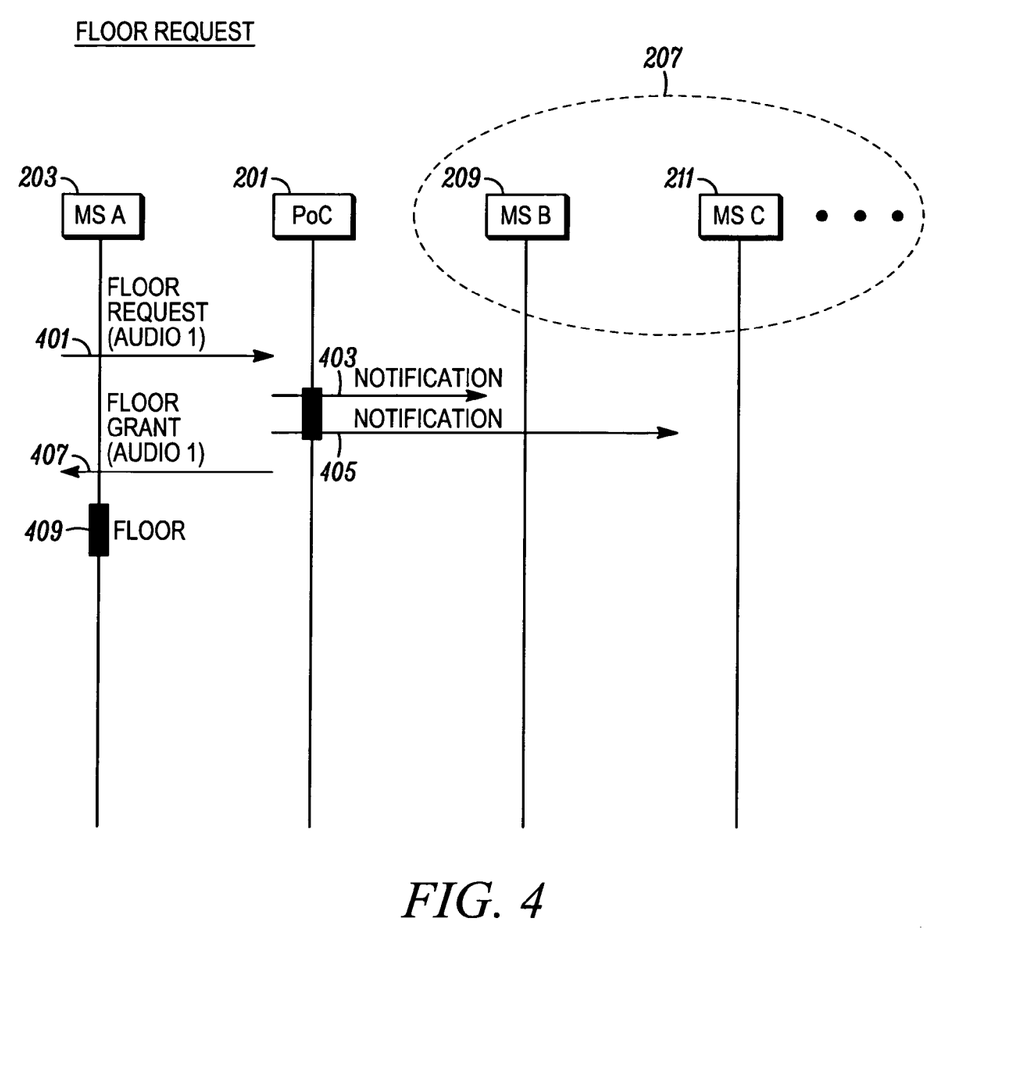
FIG. 4 is a message flow diagram illustrating the basic messaging associated with a Floor Request in accordance with an embodiment of the present invention.
Figure 5:
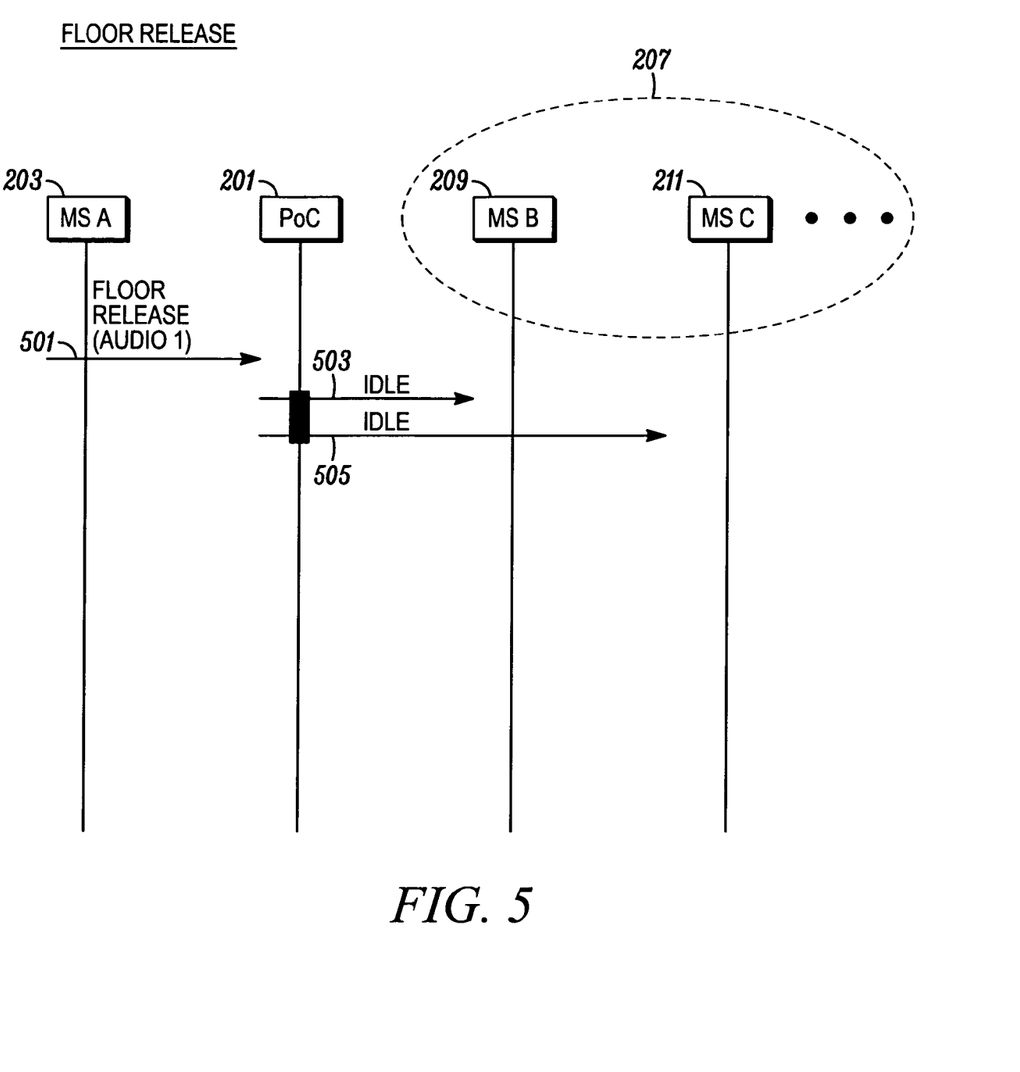
FIG. 5 is a message flow diagram illustrating the basic messaging associated with a Floor Release in accordance with an embodiment of the present invention.
Figure 6:
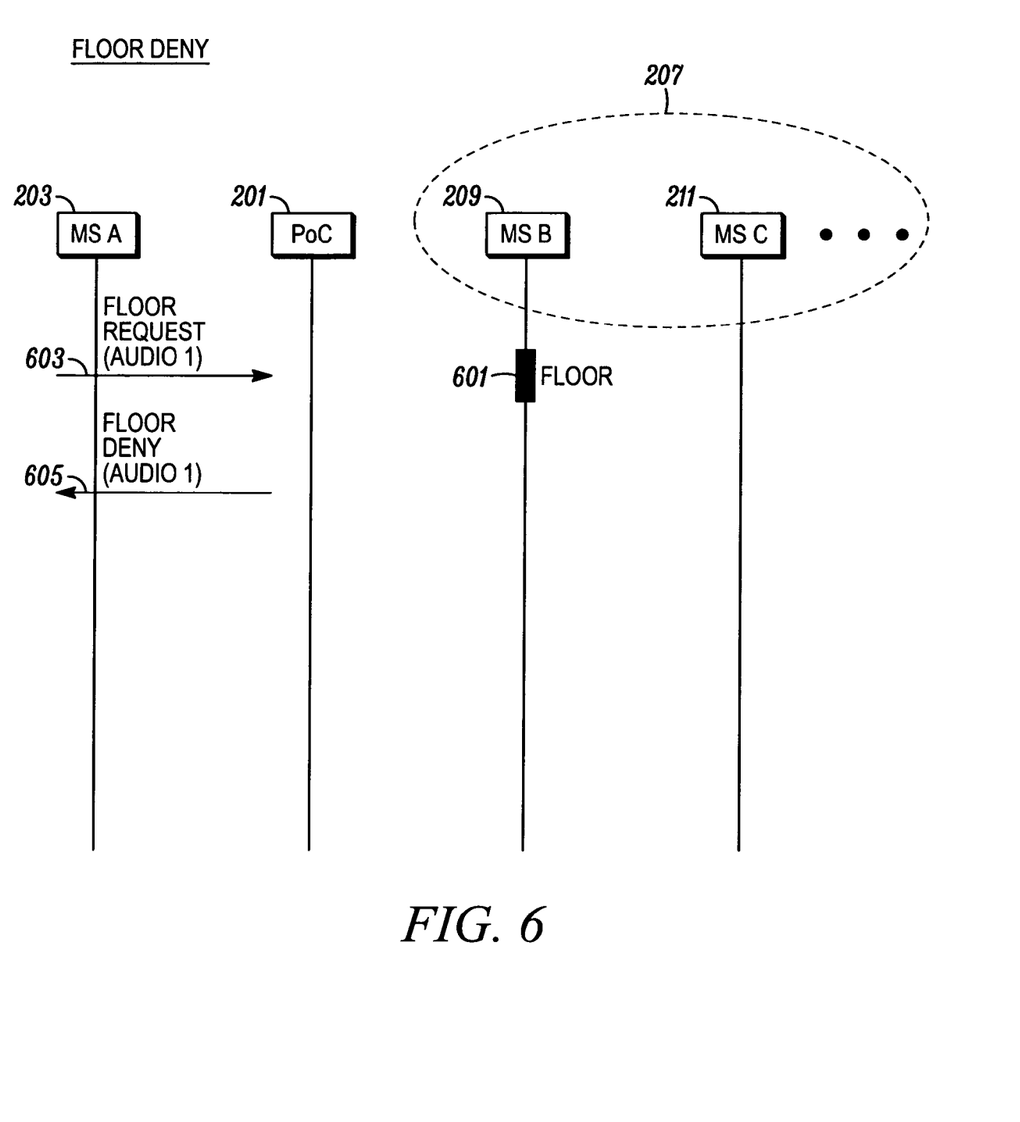
FIG. 6 is a message flow diagram illustrating the basic messaging associated with a Floor Deny in accordance with an embodiment of the present invention.
Figure 7:
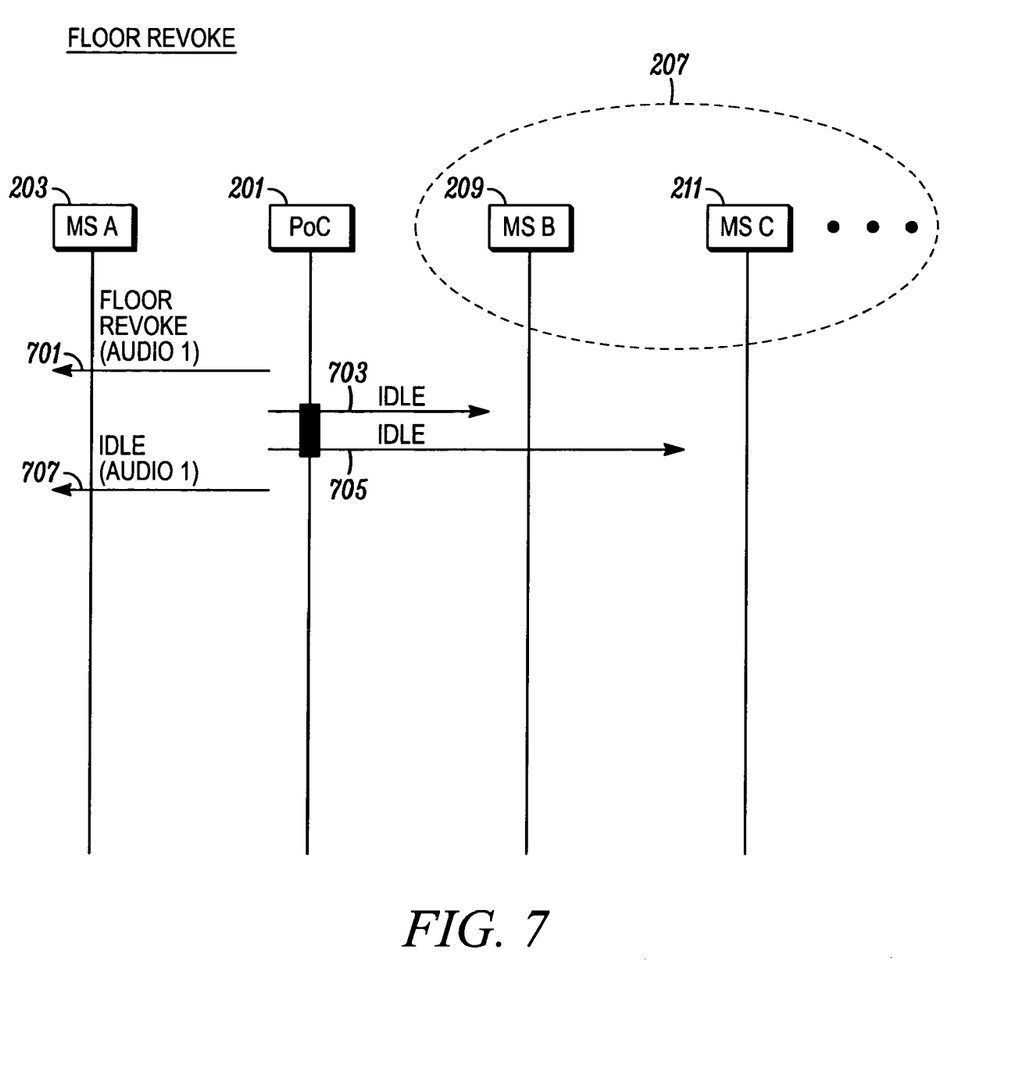
FIG. 7 is a message flow diagram illustrating the basic messaging associated with a Floor Revoke in accordance with an embodiment of the present invention.

FIGS. 4 through 8 are message flow diagrams illustrating the basic operation of floor control in accordance with the present invention. FIG. 4 illustrates a floor request procedure wherein mobile station 203 is engaged in a PTX session 217 over RAN 205 with PoC server 201. The user of mobile station 203 may request the floor for a given media type, or combination of media types, by transmitting a single floor request message 401 to PoC server 201.

For example, the user may select one or more of the icons 303, 305, 307, 309, and 311 to request a floor for one or more media types 219, 221, 223, etc. of the PTX session 217. The floor request message may comprise a SIP message in some embodiments, and more particularly a SIP INVITE message.

Assuming that resources are available for use by mobile station 203, server 201 will transmit appropriate notification messages to the other mobile stations of the talk group, for example notification messages 403 and 405 to mobiles stations 209 and 211, respectively. The server 201 may then send a floor grant message 407 to mobile station 203 whereupon mobile station 203 has the floor 409 for the requested media type or types.

Some mobile stations participating in the talk group, of which mobile station 203 is likewise a participant, may not have capabilities for certain media types, or may have preferences set to not receive certain media types. However, in the embodiments of the present invention such mobile stations would still receive the notification messages indicating which media types have been taken by mobile station 203.

The graphic display 300 on each of the mobile stations of the talk group 207 having such a display would be modified, based upon the notification messages, to display the appropriate icons for mobile station 203. As previously discussed, alternative notification methods may be employed for older generation mobile stations that do not have such a graphical display, for example media specific tones.

FIGS. 5 through 8 provide further details of the floor control messaging that occurs between the mobile station 203, the server 201, and other mobile stations of talk group 207. There are several floor control messages that are passed between a mobile station and the server 201 for example; Floor Request, Floor Grant, Floor Release, Floor Idle, Floor Taken, Floor Deny, and Floor Revoke. FIGS. 5 through 8 illustrate Floor Release, Floor Deny, Floor Revoke, and Floor Preempt, respectively.

Figure 8:
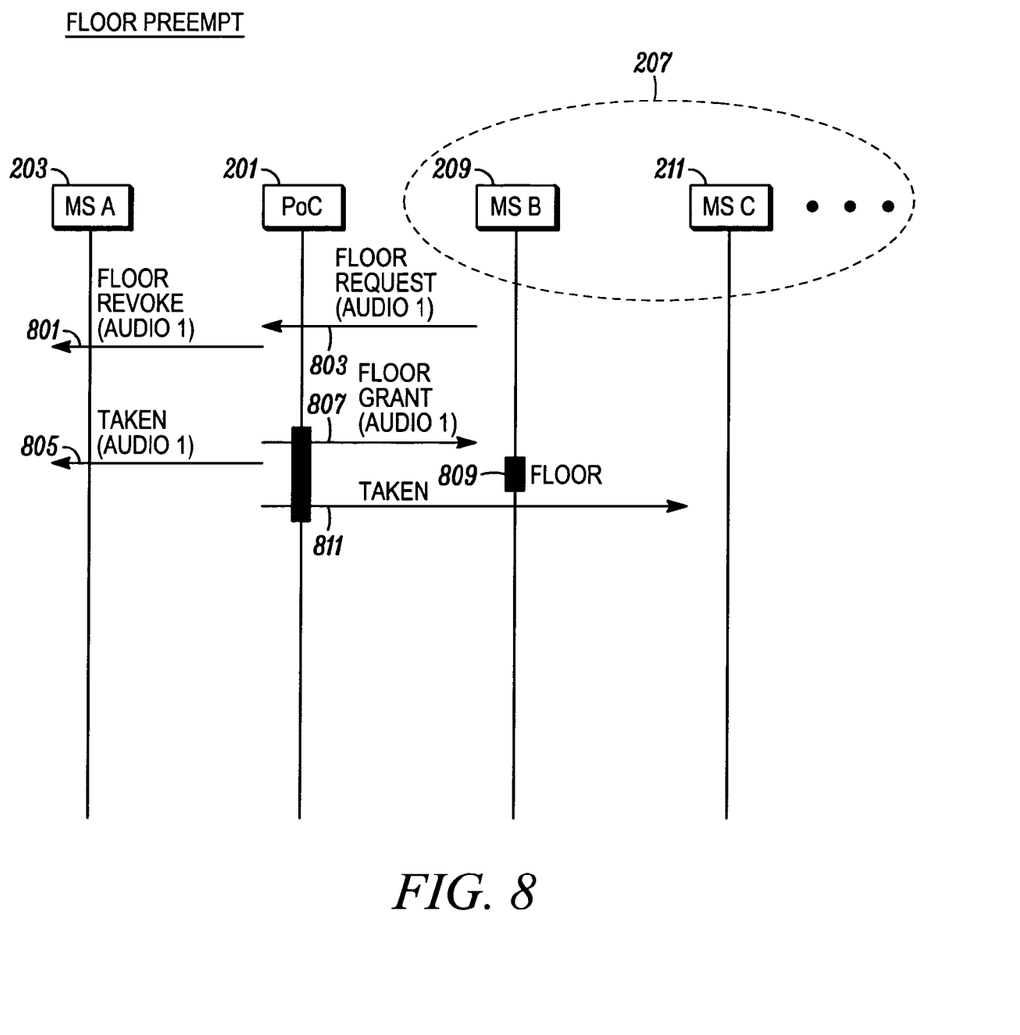
FIG. 8 is a message flow diagram illustrating the basic messaging associated with a Floor Preempt in accordance with an embodiment of the present invention.

Floor Preempt as illustrated in FIG. 8 provides a method of allocating floor grants. For example, if mobile station 203 has the floor for a particular media type, or combination of media types, a different mobile station from the talk group such as mobile station 209 may request the floor for an identical media type via Floor Request message 803. In this case, the server 201 may transmit a Floor Revoke message 801 to mobile station 203 and subsequently grant the floor, via Floor Grant message 807, to mobile station 209. Floor Taken notifications will then be transmitted by server 201 to other mobile stations of the talk group, such as Floor Taken messages 805 and 811 to mobile stations 203 and 211, respectively.

The transport protocols used in floor control messaging and server/mobile station bi-directional communications are Internet Protocols (IP) and utilize the User Datagram Protocol (UDP), and Real Time Protocol (RTP) for media. The floor control aspect of the server 201 is accomplished using Real Time Control Protocol (RTCP), Session Initiation Protocol (SIP) and Session Description Protocol (SDP). For example, a portion of an RTCP header may by used for exchanging floor control information between a server and talk group mobile stations. More particularly the ASCII string of the RTCP header may be utilized for this purpose. The floor control messages of embodiments of the present invention are preferably RTCP application-defined RTCP (RTCP APP) packets.

Figure 9:
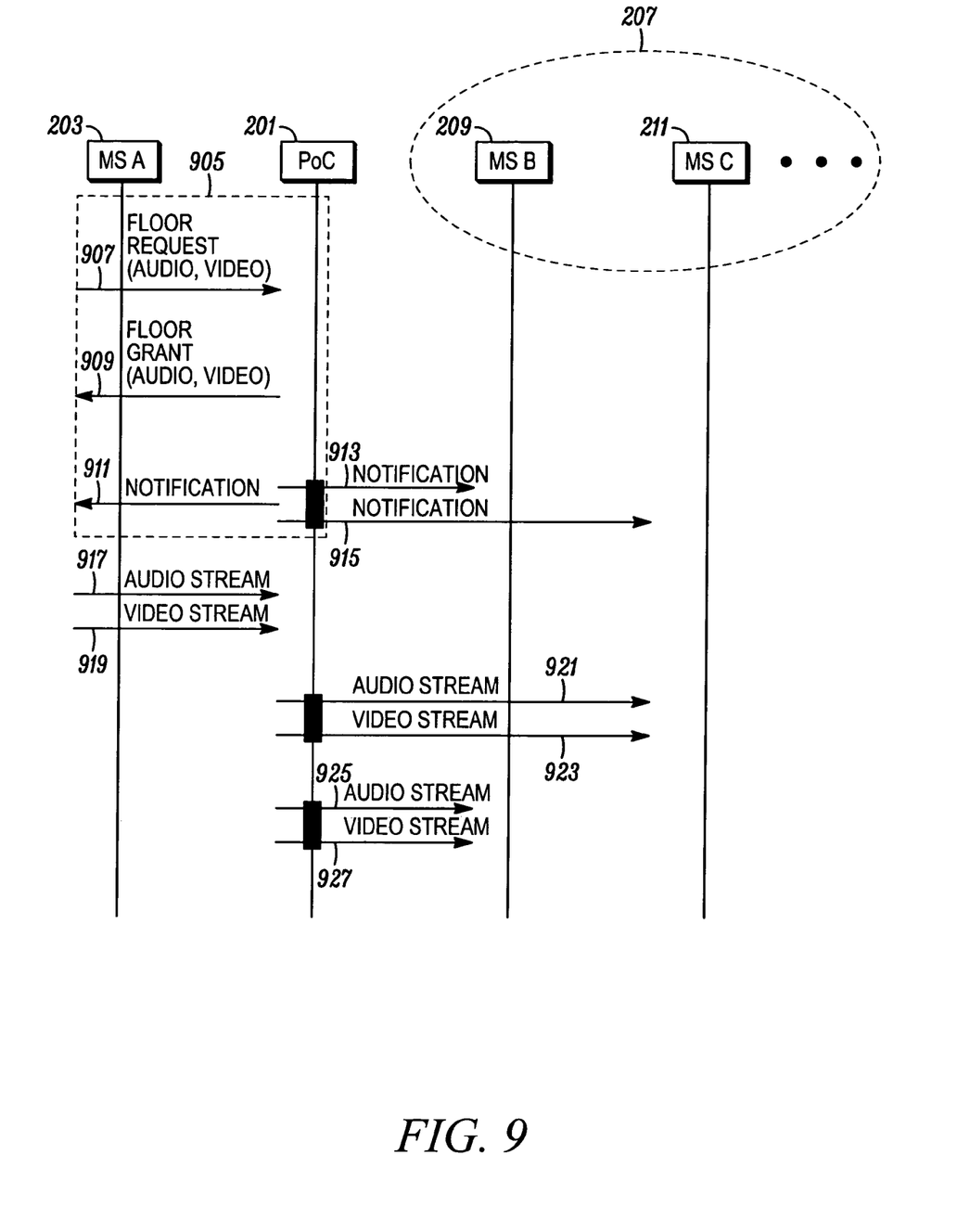
FIG. 9 is a message flow diagram illustrating the basic messaging associated with a Floor Request for a combination of media types using a single RTCP channel in accordance with an embodiment of the present invention.

FIG. 9 is a message flow diagram illustrating a single Floor Request message 907 by which two media types are requested, specifically audio and video. A single RTCP channel is used and is independent of the actual audio stream 917 and video stream 919 which are RTP channels. In the embodiments of the present invention, mobile stations of the talk group 207 that are older generation and do not have the capability to receive video streams would still receive notification over the RTCP channel as to which floors have been taken and may notify the user by specialized tones as was discussed previously herein. In FIG. 9, mobile stations 209 and 211 are shown being capable of receiving RTCP notification messages 913 and 915 respectively, as well as RTP audio and video streams.

Figure 10:
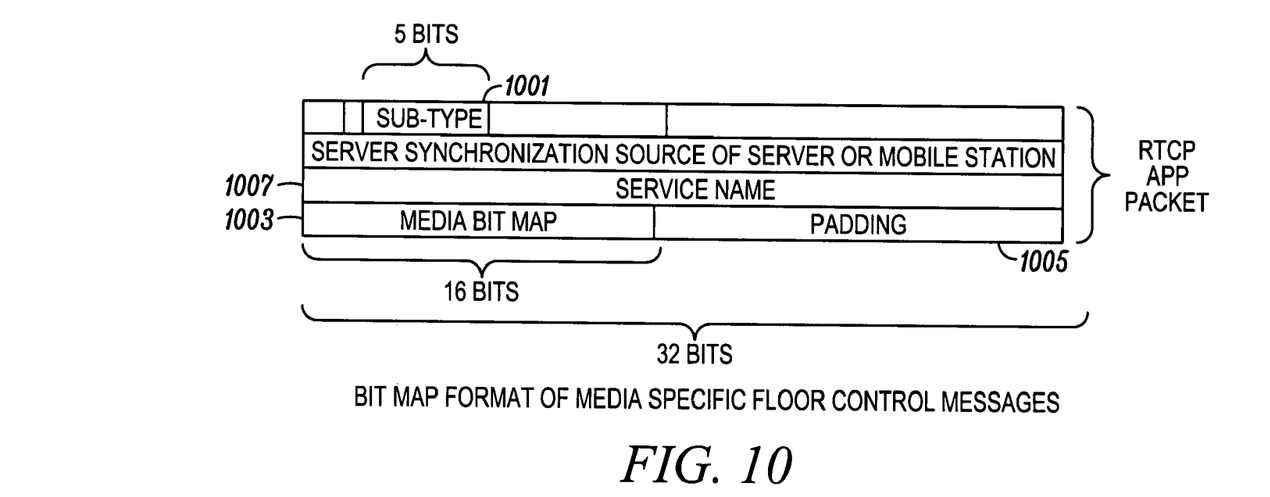
FIG. 10 is a bit map diagram illustrating an RTCP APP packet in accordance with an embodiment of the present invention.

FIG. 10 illustrates the general format of RTCP APP messages in accordance with embodiments of the present invention. Under existing floor control methodology, seven packet subtypes are defined. The RTCP APP message contains a subtype field 1001 of five (5) bits length and specifies the message type as one of; "Floor Request," "Floor Grant," "Floor Taken," "Floor Deny," "Floor Revoke," "Floor Release," and "Floor Idle." In embodiments of the present invention, the most significant bit of the subtype field 1001 is used to designate whether or not the floor control message is media specific.

For example, if the subtype field 1001 would be binary "10000" the first bit "1" indicates that the RTCP APP packet is media specific in accordance with the present invention. Likewise for Floor Grant, "10001;" for Floor Taken, "10010;" for Floor Deny, "10011;" for Floor Revoke, "10100;" for Floor Release, "10101;" and for Floor Idle, "10110" such that all seven packet types may be identified, and where the most significant bit "1" indicates media specific packets in accordance with embodiments of the present invention.

It is to be understood that the RTCP APP packet bit mapping illustrated by FIG. 10 is for describing the particular aspects of the present invention only and does not show all fields specific to any particular of the seven packet types. For example, all seven packet types may have a service name field 1007, however various other fields will exist between the illustrated subtype field 1001 and the Media Bit Map field 1003 depending on which of the specific packet types is under discussion.

However, in accordance with the embodiments of the present invention, a media specific RTCP APP packet will always comprise a thirty-two (32) bit word appended at the end that further comprises a sixteen (16) bit "Media Bit Map" 1003 and a sixteen (16) bit padding 1005.

Figure 11:
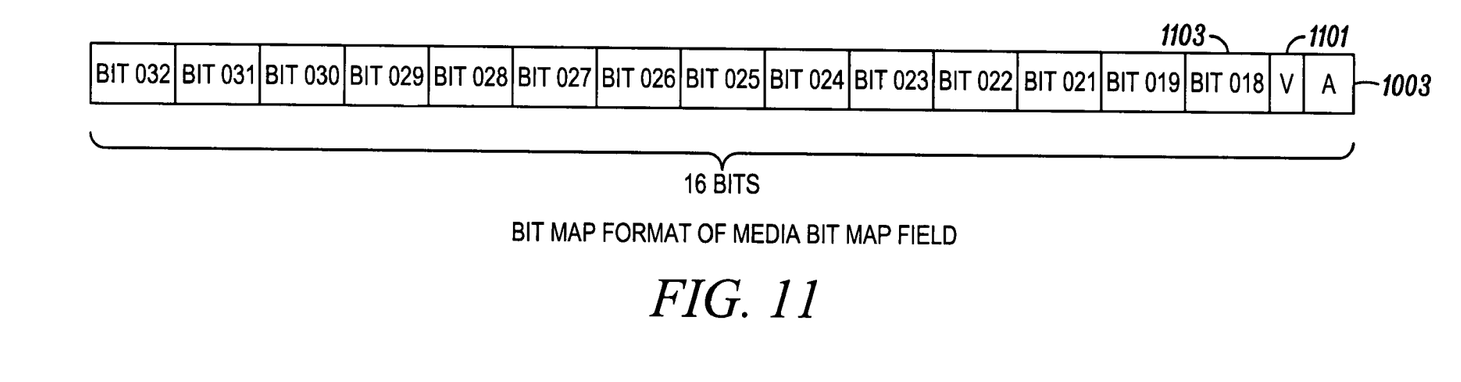
FIG. 11 is a bit map diagram illustrating a Media Bit Map field of an RTCP APP packet in accordance with an embodiment of the present invention.

FIG. 11 illustrates further details of Media Bit Map field 1003. Bit positions 1103 and 1101 are used to indicate streaming video and streaming audio, respectively, by populated the bit fields with binary "1." For example if bit fields 1103 and 1101 are "11" then a combination of video and audio is indicated. The remaining of the 16 bits of the Media Bit Map field 1003 may be defined as needed to indicate various media or application data types and their combinations. For example, one of the bit fields may indicate Message Session Relay Protocol (MSRP) for the purpose of transferring images, or may indicate File Transfer Protocol (FTP) for the purpose of transferring large media files.

Returning briefly to FIG. 9, it is to be understood that RTCP channel 905 will necessarily require that one media stream be carried over RTP. For the majority of PTX use cases, the audio (real-time speech) stream will suffice. However, in accordance with embodiments of the present invention, the criteria used for determining which RTCP channel will carry floor control messaging can be implementation specific. For example, load balancing may be employed, a default RCTP channel such as audio may be employed, or floor control may be matched to media type, etc. Further to be understood is that whether the server 201 grants the floor request, or requests, for media types or combinations of media types, will depend on availability of resources and possibly additional criteria such as QoS priorities.

Figure 12:
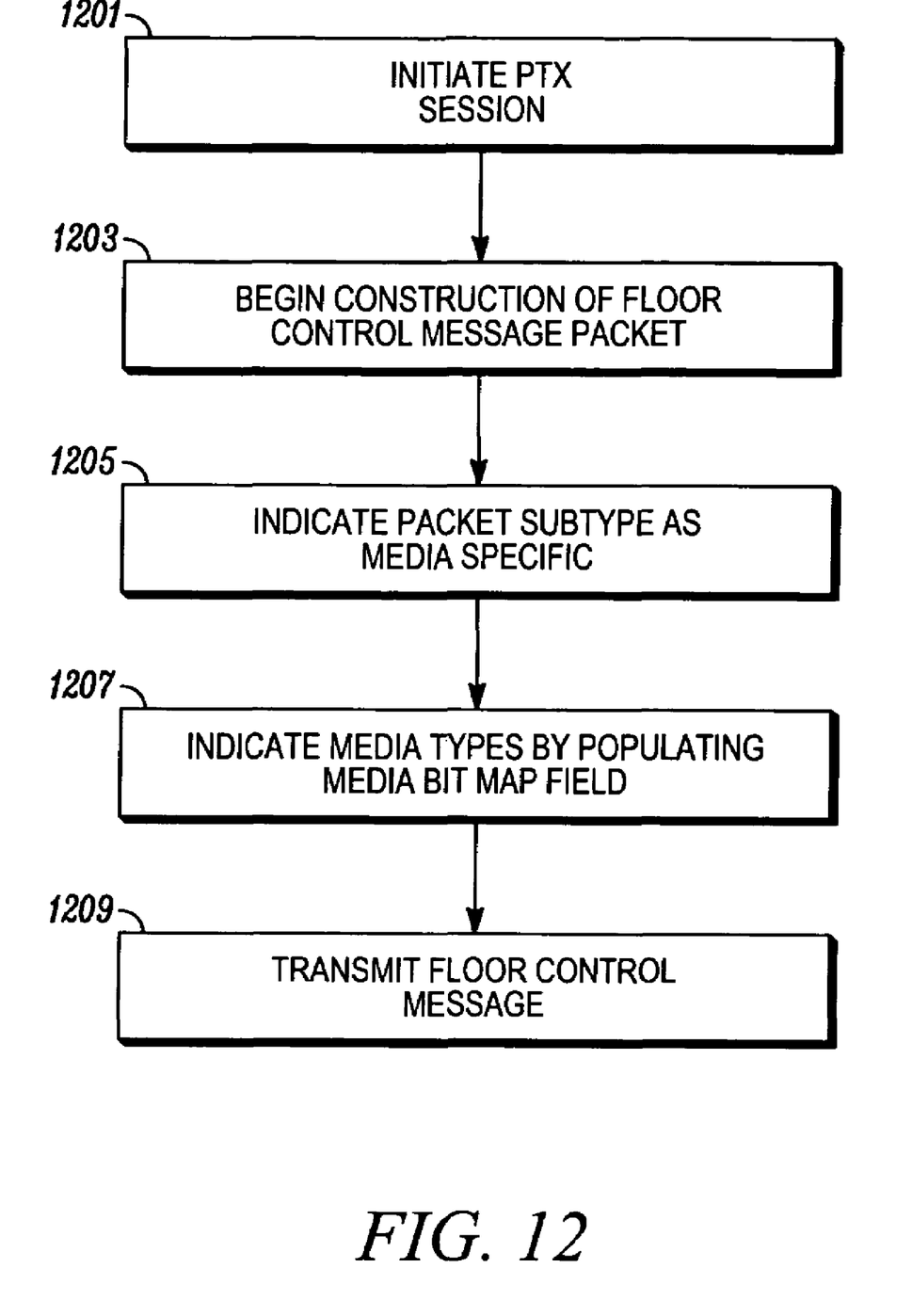
FIG. 12 is a flow chart illustrating basic operation in accordance with the embodiments of the present invention.

FIG. 12 is a flow chart illustrating basic operation in accordance with the embodiments of the present invention. In block 1201, a PTX session is initiated which may be accomplished by transmitting a SIP INVITE message in some embodiments. In block 1203, a control packet construction is begun in which the control packet may be an RTCP APP packet. In block 1205, a packet subtype field indicates that the packet is media specific, by for example having a most significant bit of "1." In block 1207, specific media types, or combinations of media types are indicated by appropriate bit values of "1" in the appropriate bit positions of a Media Bit Map field. Finally, in block 1209 the control packet is transmitted. As is apparent from FIG. 12, such message construction may be performed by a mobile station or a server depending upon the particular message.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of floor control in a Push-to-Talk communications system comprising:
    transmitting, from a mobile station, a floor control message via a floor control channel, said floor control message having a subtype field designating whether the floor control message is media specific, and where the floor control message is media specific, a media bit map indicating one of a plurality of media type designators.

2. The method of claim 1, further comprising: requesting, via said floor control message, floor control for at least one media type, said at least one media type specified by configuring the subtype field to indicate the floor control message is media specific and populating one of said media type designators corresponding to said at least one media type.

3. The method of claim 2, further comprising: receiving, by said mobile station, a second floor control message granting a floor to said mobile station, for said at least one media type.

4. The method of claim 3, wherein transmitting, from a mobile station, a floor control message via a floor control channel, further comprises: transmitting said floor control message via a Real Time Control Protocol (RTCP) channel.

5. The method of claim 4, wherein after the step of receiving, by said mobile station, a second floor control message granting said floor to said mobile station, for said at least one media type, the method further comprises: transmitting said at least one media type using Real-time Transport Protocol (RTP).

6. The method of claim 5, wherein transmitting said at least one media type using Real-time Transport Protocol (RTP) further comprises: transmitting one of audio and video.

7. A method of floor control in a Push-to-Talk communications system comprising: transmitting, from a mobile station, a floor control message via a floor control channel, said floor control message having a subtype field designating whether the floor control message is media specific, and where the floor control message is media specific, a media bit map indicating one of a plurality of media type designator fields; requesting, via said floor control message, floor control for a combination of media types, said combination of media types specified by configuring the subtype field to designate the floor control message as media specific and populating said media type designator fields, each populated designator field corresponding to a media type of said combination of media types.

8. The method of claim 7, further comprising: receiving, by said mobile station, a second floor control message granting a floor to said mobile station for at least one media type wherein said at least one media type is selected from said combination of media types.

9. The method of claim 8, wherein transmitting, from a mobile station, a floor control message via a floor control channel, further comprises: transmitting said floor control message via a Real Time Control Protocol (RTCP) channel.

10. The method of claim 9, wherein after the step of receiving, by said mobile station, a second floor control message granting said floor to said mobile station, the method further comprises: transmitting said at least one media type using Real-time Transport Protocol (RTP).

11. The method of claim 7, further comprising: receiving, by said mobile station, a second floor control message granting a floor to said mobile station for said combination of media types; and transmitting at least one media type, from said combination of media types, using Real-time Transport Protocol (RTP).

12. The method of claim 11, wherein transmitting said at least one media type using Real-time Transport Protocol (RTP) further comprises: transmitting one of audio and video.

13. A mobile station comprising: at least one transceiver; and at least one processor configured to construct a floor control message having a subtype field designating whether the floor control message is media specific, and where the floor control message is media specific, a media bit map indicating one of a plurality of media type designators.

14. The mobile station of claim 13, wherein said at least one processor is further configured to populate at least one of said media type designators of said plurality of media type designators.

15. The mobile station of claim 14, wherein said at least one processor is further configured to decode and interpret a floor control message received by said at least one transceiver, wherein said floor control message comprises a plurality of media type designators.

16. The mobile station of claim 15, wherein said floor control message is a Real-time Control Protocol (RTCP) message.

17. The mobile station of claim 16, wherein said at least one transceiver is one of GSM, GSM/EDGE, UMTS, CDMA2000, 802.11, 802.16, and Bluetooth.

\* \* \* \* \*